(12) United States Patent
Feige

(10) Patent No.: US 6,517,016 B1
(45) Date of Patent: Feb. 11, 2003

(54) PROCESS AND DEVICE FOR FINE CRUSHING OF MINERAL AND NON-MINERAL SUBSTANCES

(75) Inventor: Fritz Feige, Rosslau (DE)

(73) Assignee: CEMAG GmbH, Hameln (DE)

( * ) Notice: Subject to any disclaimer, the term of this patent is extended or adjusted under 35 U.S.C. 154(b) by 13 days.

(21) Appl. No.: 09/665,532

(22) Filed: Sep. 19, 2000

Related U.S. Application Data

(63) Continuation-in-part of application No. PCT/EP99/02606, filed on Apr. 1, 1999.

(30) Foreign Application Priority Data

Apr. 18, 1998 (DE) .......................................... 198 17 274

(51) Int. Cl.⁷ .............................................. B02C 19/00
(52) U.S. Cl. ......................... 241/29; 241/160; 241/200
(58) Field of Search ................................ 241/29, 152.1, 241/152.2, 200, 160

(56) References Cited

U.S. PATENT DOCUMENTS

| | | | | |
|---|---|---|---|---|
| 399,025 A | * | 3/1889 | Evans | 241/200 |
| 2,778,076 A | * | 1/1957 | Bell | 241/200 |
| 2,981,486 A | * | 4/1961 | Goto | 241/200 |
| 3,039,704 A | * | 6/1962 | Goto | 241/200 |
| 4,034,920 A | * | 7/1977 | Bradley | 241/200 |

FOREIGN PATENT DOCUMENTS

| | | |
|---|---|---|
| DE | 3732723 A1 | 9/1988 |
| EP | 0070547 A2 | 1/1983 |
| EP | 0610573 A2 | 8/1994 |
| GB | 448960 | 6/1936 |

* cited by examiner

*Primary Examiner*—Mark Rosenbaum
(74) *Attorney, Agent, or Firm*—Graybeal Jackson Haley LLP

(57) ABSTRACT

The invention relates to a process and the associated device for the fine crushing of solid mineral and non-mineral substances, preferably cement raw materials and cement clinker, by single or repeated compressive-load application using medium to high pressures with subsequent disagglomeration of the produced ground material in the same device.

Figure 1:
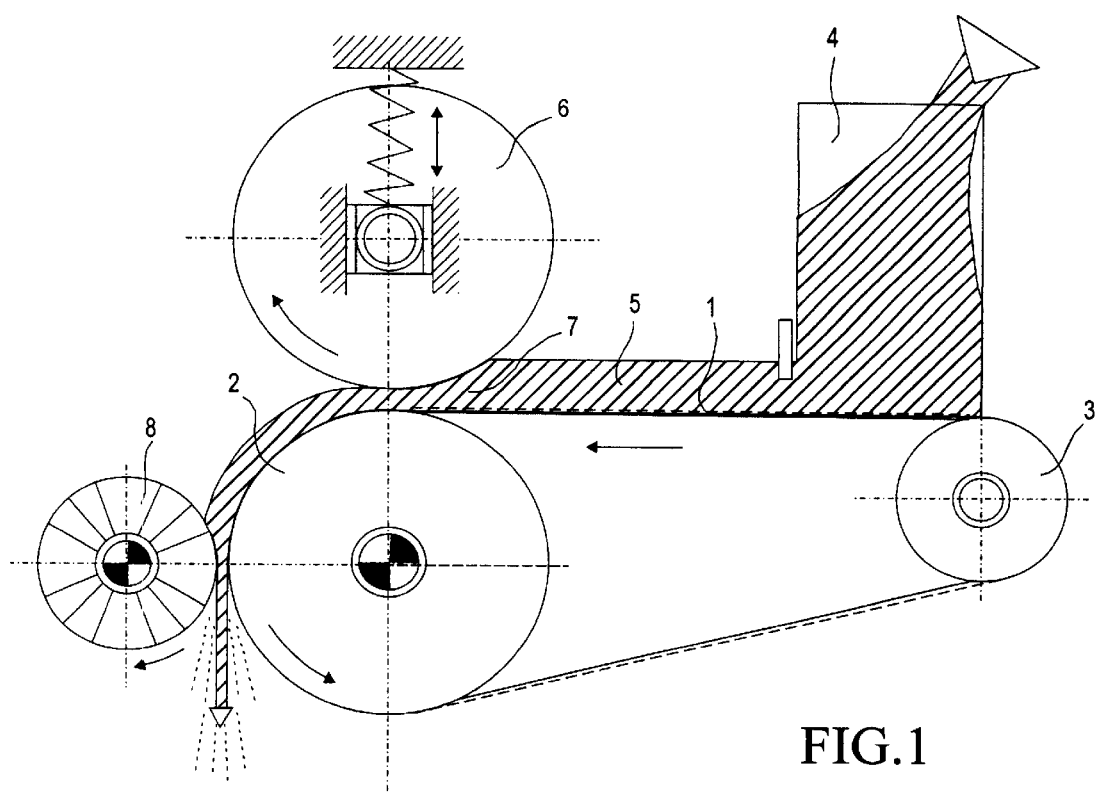

The object of the invention is to create a crushing device which, under defined conditions of control of, and load application by, the material to be ground, combined in a single device, carries out several process steps in succession, continuously feeds the material to be ground, as a defined material layer, to the grinding gap formed from pressure roller and level load-application path and, through the free choice of grinding path speed and grinding pressure, has a favorable throughput behavior with a high energy utilization and low outlay on plant.

This is achieved according to the invention in that the material to be ground is removed by gravimetric metered feed, as a defined material layer, from a feed container by the upper track, moved in translatory manner, of a plate conveyor guided continuously round a drive tumbler and reversing tumbler, suitably pre-crushed as required or subjected to some other preliminary process treatment, e.g. dried or wetted, in order to then be crushed under pressure by an elastically applied grinding roller and then disagglomerated in the same device by a fast-running striking mechanism.

16 Claims, 5 Drawing Sheets

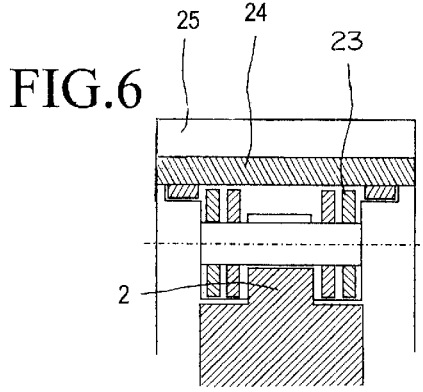
FIG.6
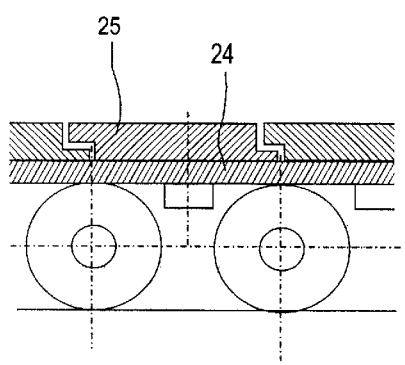
FIG.7
FIG.8
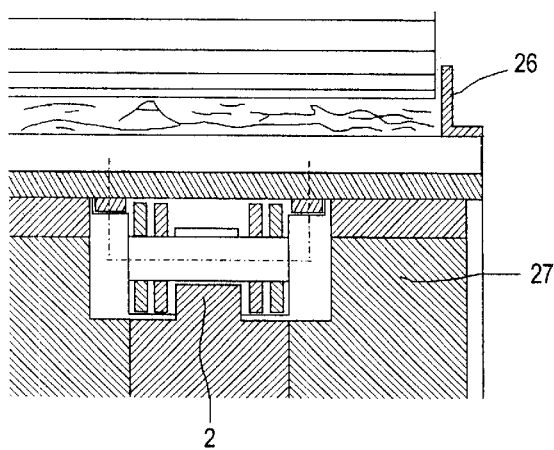
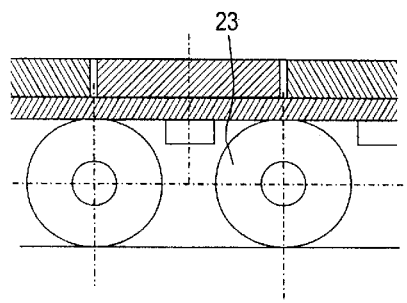
FIG.9
FIG.10
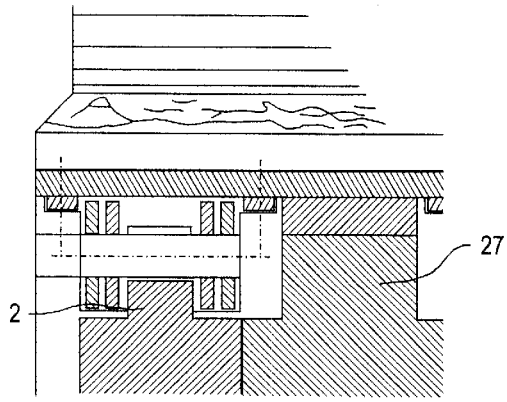
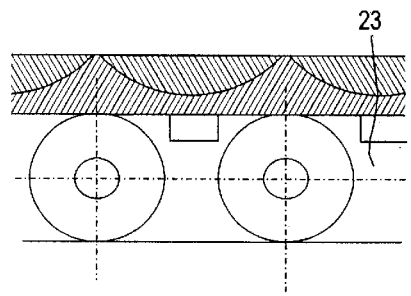
FIG.11

PROCESS AND DEVICE FOR FINE CRUSHING OF MINERAL AND NON-MINERAL SUBSTANCES

This application is a continuation-in-part of PCT/EP99/02606 filed on Apr. 19, 1999.

The invention relates to a process and the associated device for the fine crushing of mineral and non-mineral substances, preferably cement raw materials and cement clinker, by single or repeated compressive-load application using medium to high pressures (60 to 300 bar/6 to 30 Mpa) with subsequent disagglomeration of the produced ground material on the same device.

The fine crushing of mineral and non-mineral substances, such as e.g. cement raw materials or cement clinkers, is normally carried out in tubular ball and rolling mills and recently also in high-pressure crushing rollers. Although high-pressure crushing rollers have displaced the tubular mill in recent years because of their better utilization of energy, this mill, in which the compressive-load is applied to the material using high to very high pressure forces, can still be improved.

The compressive crushing of material layers in a high-pressure crushing roller, called material-bed rolling mill according to DE-B2-27 08 053 and characterized essentially in that the crushing is carried out by a single compressive-load application between two surfaces at pressures well above 50 MPa in the gap between two cylindrical rolls driven in opposite directions, has decisive disadvantages.

Firstly, high-pressure crushing rollers operate at very high pressures, i.e. with relative pressing forces between 10 to 20 kN/mm load-application range which lie many times higher than with other crushing machines using pressure mechanisms. The freedom to set these pressing forces is limited, as the mill, for reasons of vibration, must always be operated in the border range of its load-application over a level-controlled material bunker, comparable to the operation of a compacting press. The operation of the mill in this border range is, depending on the material, already characterized by the onset of a consolidation of the material layer to which the load is applied and characterized by a disproportionally high energy consumption in relation to the production of fine material, which normally rises linearly up to pressures of 50 MPa, but comes to a stop when a further load is applied. The use of high to very high pressing forces leads to a very heavy machine structure and a costly roller bearing system with complicated bearing lubrication and bearing cooling. Torque peaks, caused by foreign bodies, by skewing of the moving roller or by ventilation problems, can lead to serious damage on the armoured load-application surfaces of the rollers, to bearings, transmission elements and gears. The wear of the load-application surfaces, which often achieve service lives of only 5,000 operating hours, depending on the abrasivity of the material to be ground, is also problematic.

Secondly, high-pressure crushing rollers have an unfavourable throughput-to-speed behaviour. The throughput characteristic line of a pair of rollers charged by a feed bunker is non-linear, i.e., depending on the material properties and the geometry of the load-application surfaces, the throughput can drop by up to 50% with increasing circumferential speed. In addition, the fitted material bunker is not in a position to mix the fresh material with the recycling material and feed them to the roller gap in the mass flow, i.e. the load applied at the roller gap is in no way defined. Because of this fact and bearing in mind the vibration behaviour of the mill, which also depends very much on the particle size composition of the feed material and deteriorates with increasing speed, the circumferential speeds of high-pressure crushing rollers which are achievable in practice lie in general only between 1.0 and 1.8 m/s. The throughput of high-pressure crushing rollers thus remains limited. Large throughputs are therefore possible only through the widening of the grinding rollers with a proportional increase in the pressing forces, which is however limited in terms of machine technology.

Thirdly, high-pressure crushing rollers always lead to a multi-stage technology inside a crushing plant, as it carries out only preliminary crushing during most applications and has to be connected, via external transport routes, to appropriate apparatuses for the disaglomeration, separating, final crushing and drying of the ground material. The machine-, construction- and control-related expenditure for a crushing plant with high-pressure crushing rollers is not therefore generally lower than when using other mills. (Feige, F.: Entwicklungsstand der Hockdruckzerkleinerung, ZKG INTERNATIONAL 46 (1993) No. 9, p. 586–595).

The object of the invention is to provide a corresponding crushing device which is suitable for crushing mineral and non-mineral substances by compressive load-application in one or more load-application stages with subsequent disagglomeration with a lower outlay on machines, and for achieving appropriate material throughputs with comparatively high energy utilization.

This object is achieved in process terms according to the invention by the measures according to claim 1 and in device terms with the measures according to claim 9. Advantageous designs of the invention are stated in the dependent claims.

According to the invention, the material to be ground consisting as a rule of fresh and recycling material, is removed by metered feed, preferably gravimetric, from a feed bunker by a grinding belt designed as a plate conveyor, subjected to loading by a hydropneumatically operated pressure roller and then dissaglomerated by a fast-running striking mechanism in the discharge area of the drive tumbler. By arranging a breaker rotor between the feed bunker and the pressure roller, a preliminary crushing can also take place of the material layer, or else, using a second pressure roller, e.g. instead of the breaker rotor, a preliminary load application or preliminary compression. The preliminary compression stage, which-is always connected to a ventilator for the material layer, can also be used to compact the material, applying suitably high pressures in the gap forming from the plate conveyor and pressure roller. A dissagglomerator can be dispensed with if the crushing device does not operate in a cycle with a separator and the final crushing takes place say in a downstream-connected tubular mill.

The device according to the invention consists of an elastically operated pressure roller which is preferably arranged vertically over the driver tumbler, also in the form of a roller, of the continuous plate conveyor, so that an adjustable gap forms between the pressure roller and the plate conveyor, in which the material layer located on the plate conveyor is crushed with subsequent disagglomeration by a striking rotor preferably arranged offset at 90° in the rotation direction of the drive tumbler.

The solution according to the invention which realizes these features, has numerous advantages vis-à-vis high-pressure crushing rollers. In terms of process engineering, the advantages of the new crushing device, which will be called a belt roller mill in view of its structure and its mode of operation, are that the applied pressure levels can be freely adjusted, lie well below the pressures applied with high-pressure crushing rollers and the load is applied to the material layer in the compression section. For the crushing device according to the invention, pressures of 6 to 30 MPa are applied. For limestone of grain size $K_{80}$<40 mm and a hardness of 3.5 to 3.8 Mohs, pressures of 6 to 9 MPa are e.g. generally applied. The speed of the grinding path and the throughput are limited neither by the influence of inertia forces nor by the composition of the material to be ground nor by ventilation problems, so that the existing linear relationship between throughput and grinding path speed can be advantageously utilized in a wide speed range for regulating the throughput. With the circulating grinding path, which is designed as a plate conveyor, process operations such as bunker withdrawal, metered feed, drying or wetting can be combined, and the preliminary and fine-crushing with subsequent disagglomeration performed without intermediate transport apparatus in a single device. The metered removal of the material for grinding from the feed bunker as a defined material layer and its continuous supply to the grinding roller, lead to ideal load-application conditions, improve the material intake and deliver optimal conditions for carrying out the friction drive, i.e. for drive-less entrainment of the pressure roller by the contact with the material-laden plate conveyor.

The mechanical advantages of the belt roller mill are that it is easily repaired and maintained, all parts subject to wear are easily accessible and replaceable and longer service lives can be expected for all parts subject to wear as a result of using low pressure levels and determined movement patterns. In addition, the drive of the circulating load-application belt does not present any particular technical demands. For very high performances, it can also be designed as a double drive. The belt roller mill can be both mechanically and pneumatically connected to one or more separators in the cycle or also be advantageously used without a disagglomerator only for the preliminary crushing. By utilizing the modular properties of the belt roller mill, large material throughputs can be achieved by parallel installation, by a type of double-piston- or rotation-symmetrical arrangement of two, three or four devices.

Figure 2:
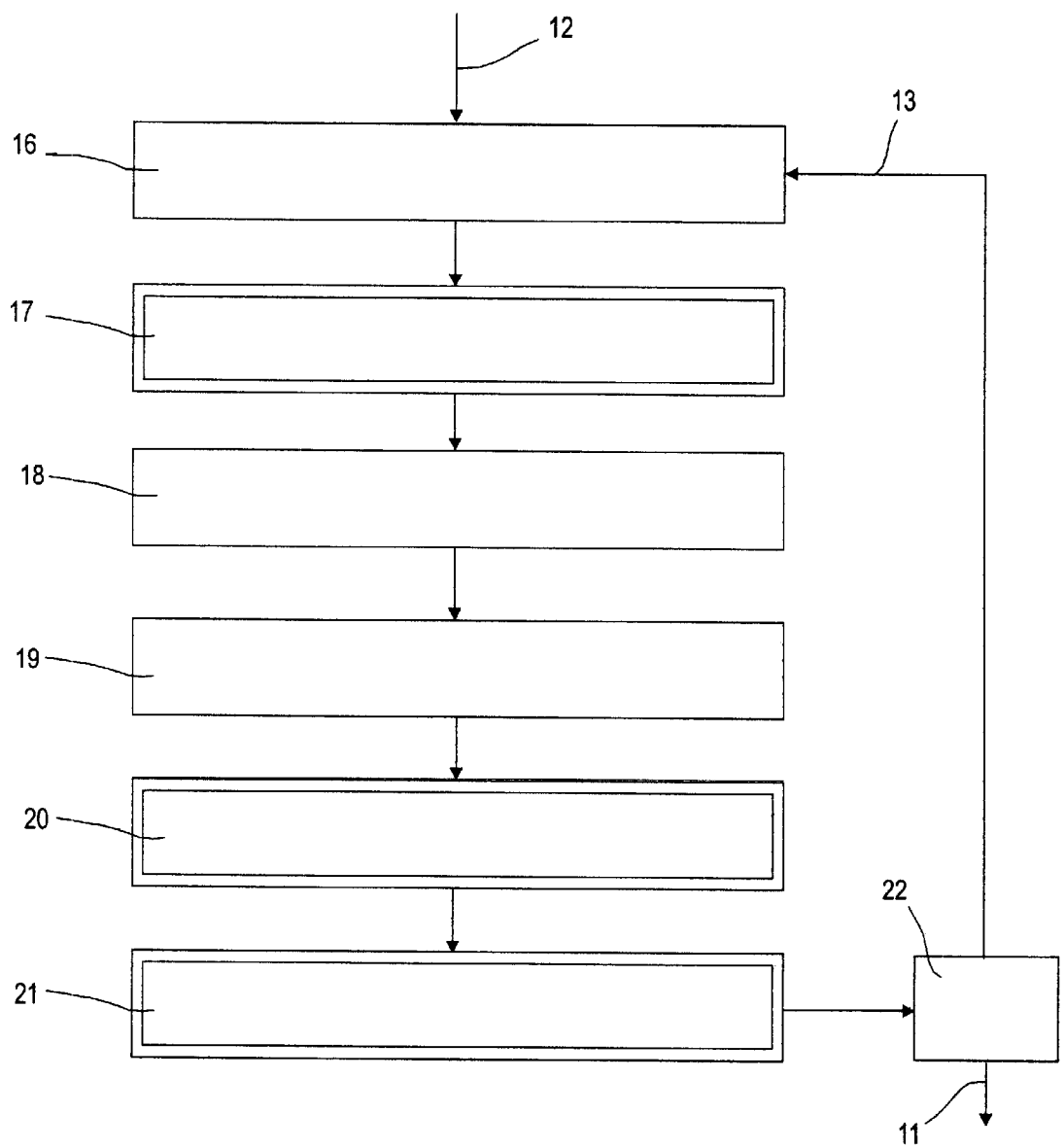
Figure 3:
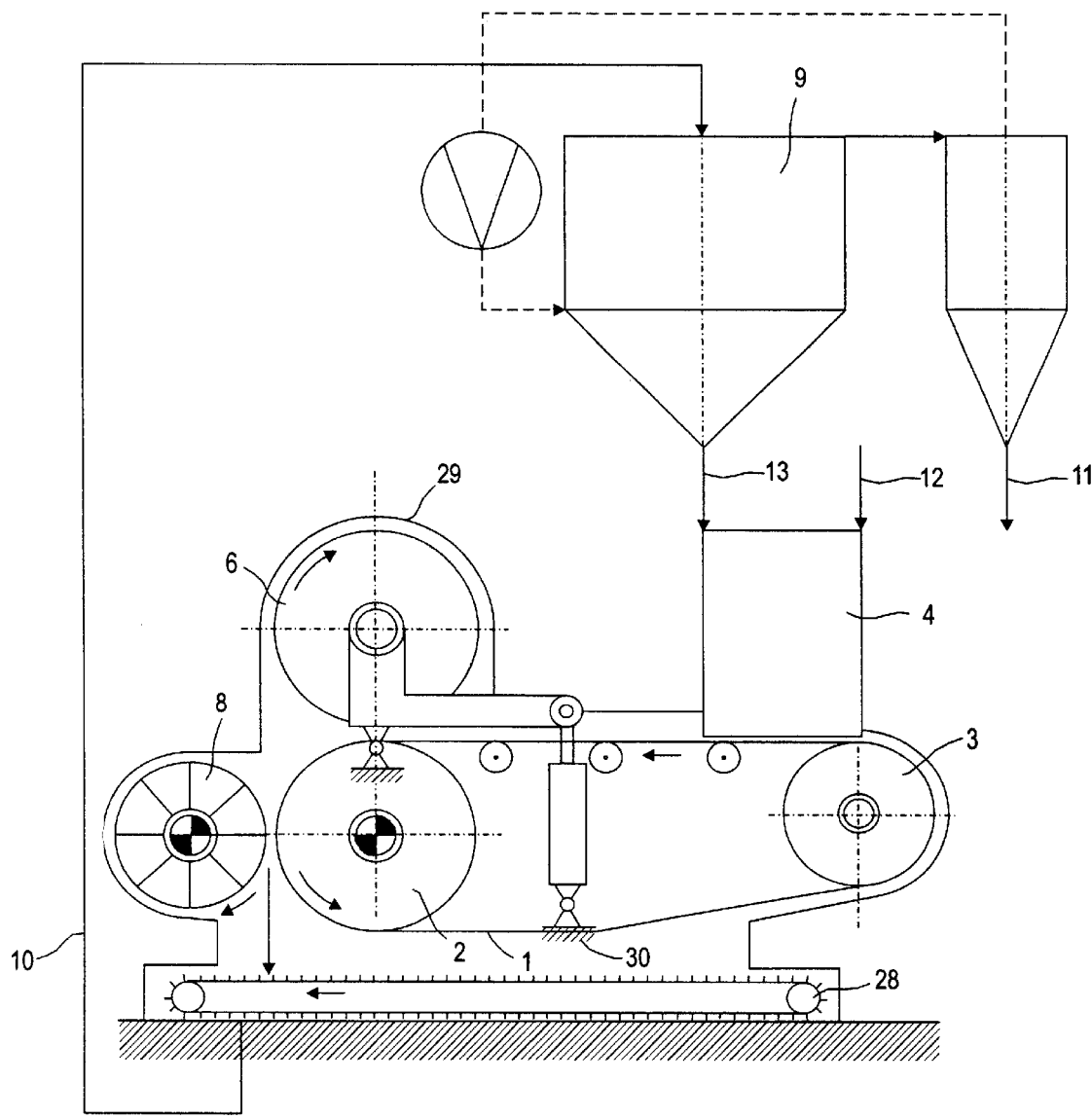
Figure 4:
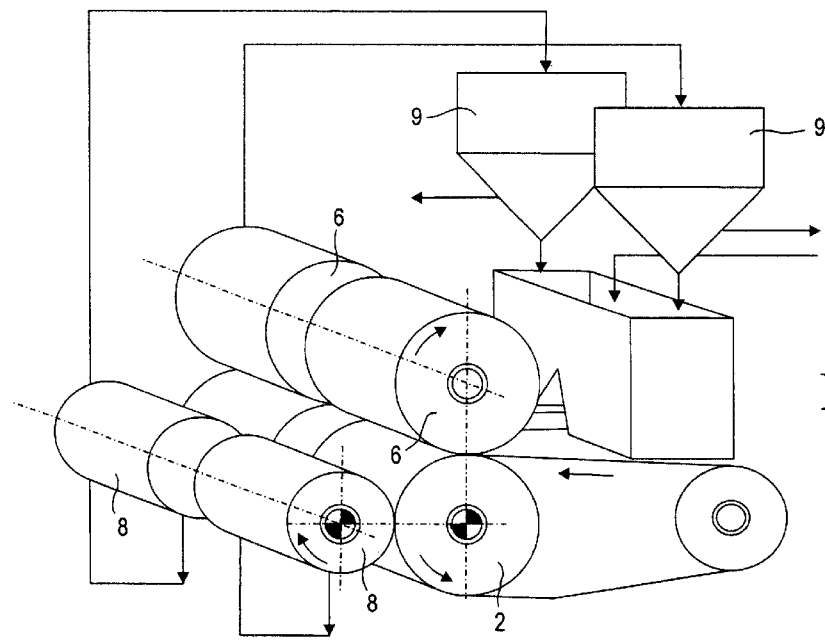
Figure 5:
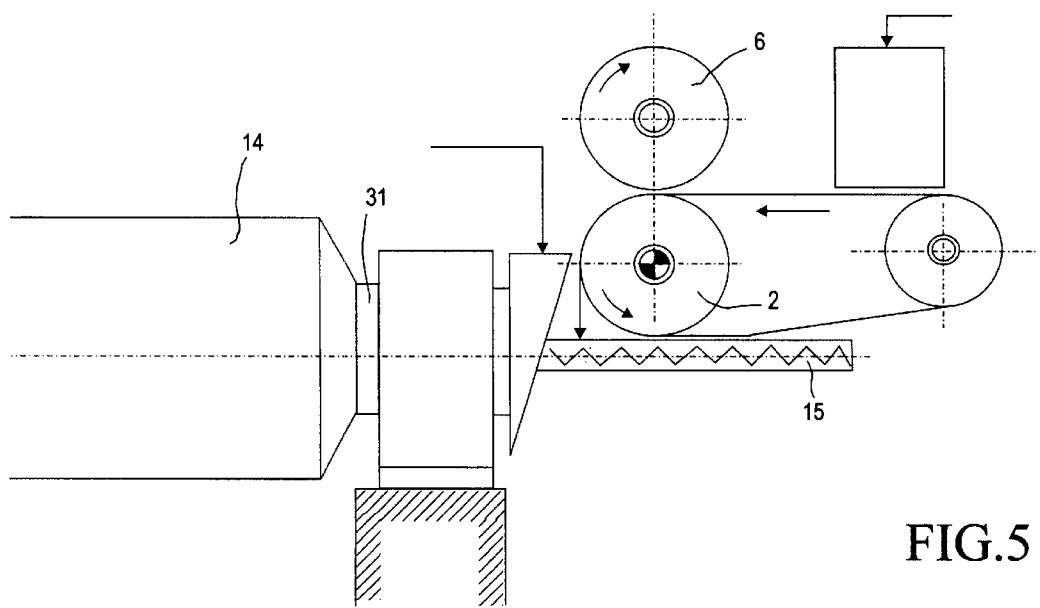

The invention is explained in detail using embodiments. The accompanying drawings show:

FIG. 1 a side view of the device according to the invention;

FIG. 2 a summary of the realizable process steps;

FIG. 3 a variation of the device according to the invention connected in cycle to a separator;

FIG. 4 a variation of the device according to the invention in parallel installation;

FIG. 5 a further variation of the device according to the invention as a preliminary mill in front of a tubular ball mill;

FIG. 6 a detail of the device according to the invention in sectional representation;

FIG. 7 the side view according to FIG. 6;

FIG. 8 a variation according to FIG. 6;

FIG. 9 the side view according to FIG. 8;

FIG. 10 a further variation according to FIG. 6;

FIG. 11 the side view according to FIG. 10.

FIG. 1 shows the belt roller mill according to the invention, shown with a disagglomerator 8. The grinding path, designed as a continuous plate conveyor 1 and pulled by means of a one- or two-stranded flat-link chain 23 over the drive tumbler 2 and the reversing tumbler 3 at a preferably continuously adjustable speed, is charged in metered doses by a feed bunker 4. The material to be ground, spread on the moving grinding path defined as material layer 5, then enters the load-application gap 7 formed by grinding path and pressure or grinding roller 6. The pressure roller 6 elastically applied to the material layer preferably has no drive of its own, but is pulled by the friction of the moved material layer. The ground material to which the load is applied is then disagglomerated by a disagglomerator 8, for example by a fast-running striking mechanism, and discharged downwards. The rotation direction of the striking mechanism, which is preferably operated at a higher circumferential speed than the plate conveyor, can also run against the direction of movement of the plate conveyor.

FIG. 2 shows in schematic representation the individual process steps which can be carried out with the belt roller mills. The secondary process operations are characterized by a single box, and the main process operations by a double box. According to the crushing task to be performed, three, at most even up to six, process steps can be carried out by the belt roller mills. The new crushing device offers good pre-conditions for its integration into a complete plant. The feed bunker, which in conjunction with the circulating grinding path, is responsible for the metered, preferably gravimetric, feed and the structure of the material layer 17, can simultaneously also fulfil the function of a bunker seal and removal means 16. If the supplied fresh material 12 is very coarse-particled, a preliminary crushing 18 can also take place directly after the feed bunker by means of a fast-running breaker rotor. The preliminary crushing stage 18 can also however consist of a preliminary compression of the material layer by an elastically applied pressure roller. In a further process step 19, the material to be ground can then be dried on its surface, freed of foreign bodies or pre-treated say with a suitable grinding auxiliary material, e.g. with water, for the further crushing. In the next process stage, the fine crushing 20 takes place, using e.g. the grinding roller applied elastically to the material layer with the aim of producing a large proportion of finished material, e.g. expressed as D90 throughput. In the subsequent last process step, the resulting ground material which is more or less briquetted after the compressive-load application is disagglomerated by a fast-running striking mechanism 21 and removed from the grinding path. Depending on the crushing task to be performed, the belt roller mill can also be connected in cycle to a separator 22 via a mechanical or pneumatic material transport. The finished-material 11 is removed from the system via the finished-material discharge means whilst the recycled material is returned to the mill in the cycle 13.

FIG. 3 shows the belt roller mills cooperating with a hydropneumatic pressing device 30 for the pressure roller 6, a disagglomerator 8 designed as a striking rotor and a separator 9 switched in cycle, which is charged either mechanically or pneumatically via the material path 10. The coarse-grained material separated in the separator 9 is supplied to the feed bunker 4 as a recycling material and thus returned into the grinding process. The finished material 11 is removed from the system after separation from the gas stream. The belt roller mill according to the invention is enclosed by a non-load-bearing housing 29, in which sections which can be raised are arranged to give access to the plate conveyor 1, to the pressure roller 6, to the drive tumbler 2 and reversing tumbler 3 as well as to the disagglomerator 8. For the removal of the crushed material, a continuous conveyor, preferably an armoured chain conveyor 28, is arranged under the lower track of the circulating plate conveyor.

FIG. 4 shows by way of example the parallel installation of two belt roller mills each connected in cycle to a separator 9. This modular arrangement of two fully-equipped grinding plant units is very suitable for achieving particularly large throughputs. In addition, this arrangement has advantages vis-à-vis a single large unit for part-load operation and for any modular increase in capacity when using the same mechanical components. A large grinding plant which comprises of two parallel-connected units is still 50% operational during exceptional situations. Furthermore, such a plant configuration has favourable repair and maintenance properties.

A material layer belt roller mill is represented in FIG. 5 which operated as preliminary mill in combination with a tubular ball mill 14. As the tubular ball mill functions as a finishing mill in this configuration, the dissaglomerator can be dispensed with. In the example shown, the material pre-ground in the preliminary mill, is fed, without intermediate screening, by a tubular screw conveyor 15 via the neck bearing journal 31 of the tubular ball mill 14.

FIGS. 6 to 11 show several embodiments of drive tumblers and load-application conveyor in sectional representations and side views:

FIGS. 6 and 7 show a toothed drive tumbler 2 which pulls a flat-link chain 23, onto which armour plates 25 are screwed. Located between the flat-link chain 23 and screwed-on armour plates 25 is a steel-wire-reinforced rubber belt 24 which serves to prevent material from falling through. The flat-link chain 23 can for example be a caterpillar chain customary in the trade.

FIGS. 8 and 9 show a version for which the plate conveyor rests on the rubberized roller bodies 27 on both sides on the central chain. Angle irons 26 can be arranged on the armoured plates to laterally restrict the material layer.

FIGS. 10 and 11 show a particularly heavy version using two flat-link chains 23. In this version, edges of the plate conveyor 1 rest on the two drive tumblers 2, and its central section on a rubberized roller body 27. The armoured plates 25 which are specially developed in their cross-section can according to FIG. 11 also be vulcanized on the rubber laid underneath and screwed accordingly to the flat-link chain 23.

LIST OF REFERENCE NUMBERS 1 plate conveyor
2 drive tumbler
3 reversing tumbler
4 feed bunker
5 material layer
6 pressure roller
7 gap
8 disagglomerator
9 separator
10 material path
11 removal of finished material
12 supply of fresh material
13 supply of recycling material
14 tubular ball mill
15 tubular screw conveyor
16 bunker closure and material removal means
17 metered feed and material layer structure
18 preliminary crushing and/or compression and material layer structure
19 mixing, drying, wetting and removal of foreign bodies
20 fine crushing
21 disagglomeration
22 separation
23 flat-link chain
24 rubber belt
25 armour plate
26 angle iron
27 roller body
28 armoured chain conveyor
29 housing
30 hydropneumatic pressing device

What is claimed is:

1. A process for the fine crushing of mineral and non-mineral substances in a gap formed between a continuous, evenly moved plate conveyor and a pressure roller, the plate conveyor being arranged horizontally or slightly inclined towards the pressure roller and the pressure roller being arranged above the plate conveyor, the process comprising the following steps:

keeping the plate conveyor continuously fed by a layer of the mineral and non-mineral substances, the material layer being gravimetrically fed in metered doses by changing the speed of the plate conveyor; and singly or repeatedly applying the pressure roller elastically to the material layer by hydropneumatic pressing forces, the resulting pressures being medium to high.

2. The process of claim 1, comprising the step of disagglomerating the produced ground material directly after applying the pressure roller on the same device by a disagglomerator running in the opposite direction to the material-laden plate conveyor and operated at a greater speed.

3. The process of claim 1, comprising the step of crushing the substances finally in a downstream-connected tubular mill.

4. The process of claim 1, wherein the step of repeatedly applying the pressure roller elastically to the material is carried out by applying at least two pressure rollers connected in series in the direction of transport of the material elastically to the material layer with different pressure levels.

5. The process of claim 1, wherein the speed of the plate conveyor is continuously adjustable.

6. The process of claim 1, comprising the step of feeding the mineral and non-mineral substances as fresh and recycled material to the plate conveyor via a feed bunker which is level-controlled from outside.

7. The process of claim 1, comprising the step of feeding the mineral and non-mineral substances as fresh and recycled material to the plate conveyor from a silo located above it.

8. The process of claim 1, wherein the pressure roller applied to the material layer has no drive of its own and is pulled by the friction with the material layer.

9. The process of claim 1, comprising the step of the precompressing and ventilating the layer of the mineral and non-mineral substances on the plate conveyor by one or more precompressing rollers and then compacting it by the pressure roller.

10. Device for the fine crushing of mineral and non-mineral substances comprising:

a continuous plate conveyor, evenly moved by means of a drive tumbler;

a feed bunker for metered, continuous charging of the plate conveyor with a defined layer of the mineral and non-mineral substances;

a pressure roller elastically applied to the layer and arranged vertically above the driver tumbler and the layer of the mineral and non-mineral substances, so that an adjustable gap is formed between the pressure roller and the plate conveyor, the layer located on the plate conveyor being crushed in the gap;

the plate conveyor being arranged horizontally or slightly inclined towards the pressure roller; and means for exerting forces on the pressure roller so that the crushing takes place at medium to high pressures.

11. Device according to claim 10, comprising a disagglomerator having a striking rotor generally offset by 90° in the direction of rotation of the drive tumbler.

12. Device according to claim 10, wherein the plate conveyor is pulled by one or more flat-link chains and driven via the drive tumbler.

13. Device according to claim 12, wherein the plate conveyor includes plates detachably connected to the flat-link chains.

14. Device according to claim 10, comprising a continuous conveyor arranged under the lower track of the plate conveyor.

15. Device according to claim 10, comprising a non-load-bearing housing in which sections which can be raised are arranged to give access to the plate conveyor, to the pressure roller and to the tumbler.

16. Device according to claim 10, wherein up to four crushing devices are combined in modular manner by parallel, mirror-image or rotation-symmetrical arrangement.

* * * * *